May 19, 1942.    S. B. WHITLOCK    2,283,303
OIL LEVEL REGULATOR
Filed Aug. 26, 1941    2 Sheets-Sheet 1
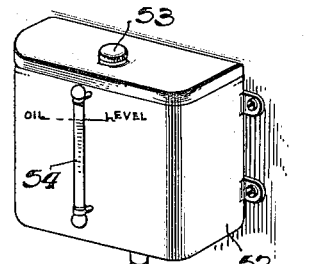
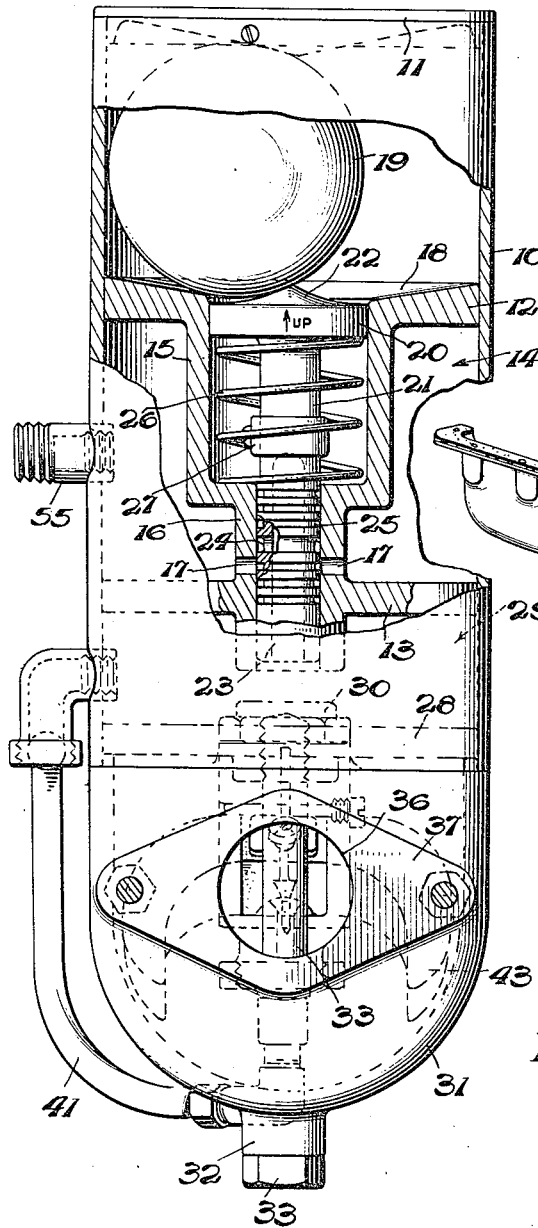
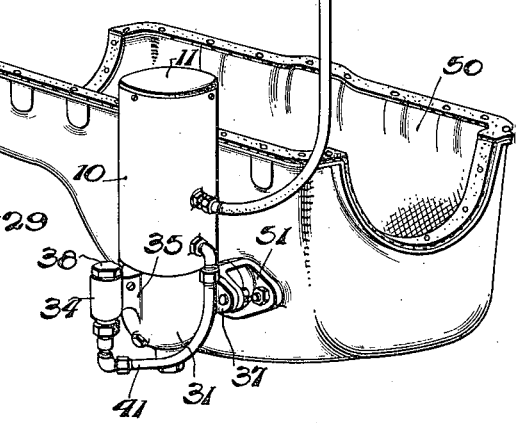
Inventor
Stewart B. Whitlock.
By Thos. H. Johnston
Attorney May 19, 1942.   S. B. WHITLOCK   2,283,303
OIL LEVEL REGULATOR
Filed Aug. 26, 1941   2 Sheets-Sheet 2
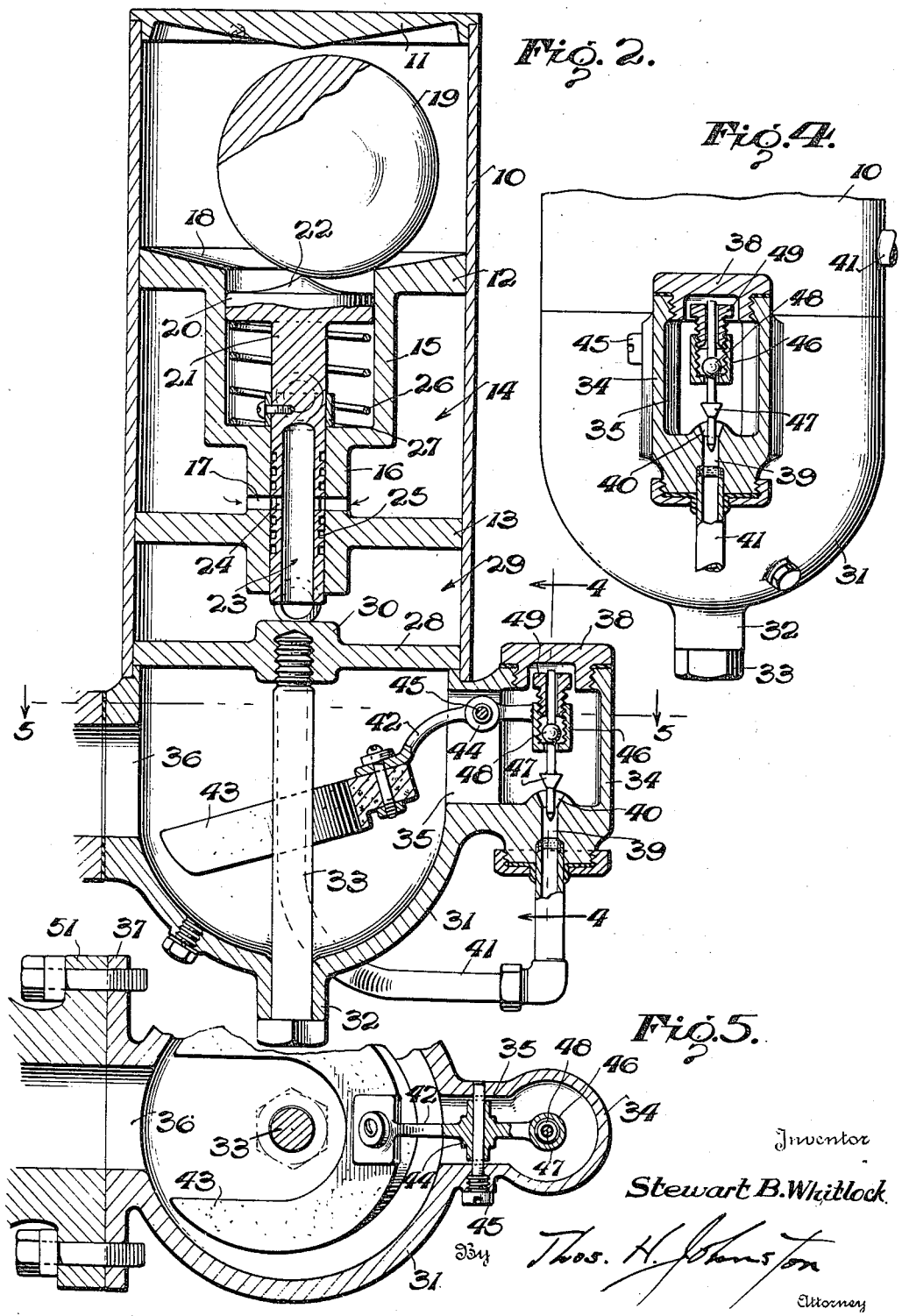
Inventor
Stewart B. Whitlock
By Thos. H. Johnston
Attorney Patented May 19, 1942

2,283,303

UNITED STATES PATENT OFFICE 2,283,303

OIL LEVEL REGULATOR

Stewart B. Whitlock, Rising Sun, Ind.

Application August 26, 1941, Serial No. 408,379

10 Claims. (Cl. 137—68)

This invention relates to an improved oil level regulator especially adapted for internal combustion engines.

Heretofore, in most engines of the kind, the oil pressure pump is, as is well known, located near the bottom of the crank case with the result that the oil circulated to the bearings of the engine is taken from that volume of oil in the crank case nearest the bottom and therefore sullied with all the sludge, metal and perhaps grit that has been accumulated. Obviously, this results in premature wear of the engine bearings.

It is therefore an object of the present invention to provide an oil level regulator which will automatically maintain a substantially constant level of oil in the crank case of an engine and which, therefore, will render it possible to locate the oil pressure pump of the engine near the surface of the pool of oil in the crank case, so that the cleanest oil of the pool may be circulated to the engine bearings.

A further object of the invention is to provide a regulator wherein the feed of oil, by gravity, to the crank case will be controlled by a rolling element responsive to changes in inclination of the crank case, so that tilting of the crank case to shift the level of oil therein may not, beyond certain limits, create a false demand for additional oil.

Still another object of the invention is to provide a regulator wherein some latitude in the exact oil level in the crank case may be obtained or varied by adjustment of free play in the feed valve employed as affected by the movement of the actuating float therefor.

A further object of the invention is to provide a regulator wherein the supply valve assembly of the device may be installed as a unit in the casing employed, and wherein the casing and float bowl used will be composed of separate parts, freely detachable, so that access may be readily had to the mechanism of the device.

And the invention seeks, as a still further object, to provide a device well adapted for general use but particularly suitable to alleviate the lubrication problems of the average automobile engine as now manufactured.

Other and incidental objects of the invention will appear during the course of the following description, and in the drawings, Figure 1 is a perspective view showing my improved regulator applied to a typical crank case of an internal combustion engine.

Figure 2 is a transverse vertical section taken medially through the device and showing the supply valve open.

Figure 3 is a rear elevation partly broken away and shown in section, the supply valve being closed.

Figure 4 is a section on the line 4—4 of Figure 2.

Figure 5 is a section on the line 5—5 of Figure 2.

In carrying the invention into effect, I employ a cylindrical casing 10 open at both ends, and closing the upper end of the casing is a removable cap 11.

Fashioned to have a pressed fit within the casing 10 is a supply valve assembly which may be pushed into the casing from either end thereof. As more particularly seen in Figure 2 of the drawings, this assembly includes an upper plate 12 and a parallel lower plate 13 which provide partitions defining an intervening supply chamber 14 within the casing. Depending from the upper plate 12 axially thereof is a cylinder 15 open at its upper end, and depending from the bottom of the cylinder is an axial sleeve 16 on which the lower plate 13 is formed. Piercing the sleeve immediately above the plate 13 are aligned outlet passages 17 for the chamber 14. The plate 12 is provided with a cupped upper face 18 sloping toward the upper end of the cylinder 15, and disposed within the upper end of the casing 10 to coact with said face is a valve actuating ball 19 free to roll in all directions.

Reciprocable in the cylinder 15 is a supply valve 20 having a stem 21 slidable through the sleeve 16. The head of this valve is provided with a more or less conical upper terminal 22 while the stem is hollow at its lower end portion to provide an outlet passage 23. Intersecting the passage 23 are aligned outlet ports 24 adapted to register with the passages 17 of the sleeve 16 and at the level of said ports, the stem may be externally grooved, as shown, to conduct oil from the passages 17 to said ports should the ports and passages get out of line. Preferably, the lower end portion of the stem is provided with a series of vertically spaced annular grooves 25 some above and some below the ports 24 to provide an oil seal between the stem and sleeve, as will be well understood.

Disposed within the cylinder 15 is a spring 26 pushing the valve 20 upwardly to closed position, when the ports 24 will be out of register with the passages 17 of the sleeve 16, and secured to the stem is a stop collar 27 engageable with the bottom wall of the cylinder for limiting the valve in its downward movement to open position, when said ports will be in register with said passages. The ball 19 will, of course, be of sufficient weight to depress the valve 20 to open position against the tension of the spring 26 and, as seen in Figure 2 of the drawings, the ball will, when the casing 10 is disposed near the vertical, be guided by the cupped face 18 of the plate 12 to roll into the upper end of the cylinder 12 and engage the terminal 22 of the head of the valve for normally holding the valve open. However, when the casing 10 is tilted too far away from the vertical, the ball 19 will, as seen in Figure 3, roll away from the tip of the terminal 22 of the valve to abut the wall of the casing, when the valve 20 will be shifted upwardly by the spring 26 to closed position.

As will be perceived from the foregoing, the ball 19 will automatically control the opening and closing of the valve 20 responsive to the tilting of the casing 10 in any direction. The slope of the face 18 of the plate 12 will, of course, determine the degree of angularity of the casing 10 from the vertical at which the ball will roll away from the tip of the valve to permit the valve to be closed by the spring 26. In practice, I have found that about a ten degree slope of the face 18 to best answer the purposes of the invention but, of course, I do not wish to be limited in this regard.

Fashioned to have a pressed fit within the lower end portion of the casing 10 is a bottom plate 28 pushed into the casing from the lower end thereof and providing a partition defining a discharge chamber 29 intervening between said plate and the plate 13. Axially, the plate 28 is provided with a hub 30.

Detachably connected to the lower end of the casing 10 is a mating float bowl 31 provided at the bottom thereof with a sleeve 32, and extending through said sleeve is a cap bolt 33 screwed at its upper end into the hub 30 of the plate 28 for firmly clamping the parts together. At one side thereof, the bowl 31 is formed with a communicating feed valve chamber 34 connected with the bowl by spaced parallel walls 35 while at the opposite side of the bowl is an outlet 36 adjacent which latter are, as seen in Figures 1 and 3, lateral flanges 37. Closing the chamber 34 at its upper end is a removable cap 38 and formed through the thickened bottom wall of said chamber is a passage 39 at the upper end of which is a valve seat 40. Extending between the discharge chamber 29 of the casing 10 and the passage 39 is a pipe 41 which, preferably, is detachably mounted.

Mounted to rock between the walls 35 is a float lever 42 to the forward end of which is attached a suitable float 43 cut away, as seen in Figure 5 of the drawings, to straddle the bolt 33. The lever 42 is provided with a hub 44 and extending through said hub is a removable pin 45 journaling the lever. Formed on the rear end of the lever is a socket 46, and extending freely through said socket is a feed valve 47 to coact with the seat 40. At its lower end portion, the stem of the valve extends into the passage 39, and formed on the stem at its upper end portion is a ball 48 freely received within the socket. Screwed into the socket at its upper end is a stop nut 49 to coact with the ball 48 and, as will be observed, the nut is bored to freely receive the upper end of the stem therethrough.

In Figure 1 of the drawings I have shown a conventional crank case of an internal combustion engine at 50. Preferably, a coupling 51 is employed between the bowl 31 and the crank case, said coupling being detachably connected to the flanges 37 and likewise detachably connected to the crank case, and, if so desired, a suitable screen may be associated with said coupling to prevent impurities in the oil in the crank case from gaining entrance to the bowl. Thus, the casing 10, bowl 31 and associated parts will be rigidly fixed to normally stand vertically at one side of the crank case and, of course, the bowl will communicate with the crank case at such point with reference to the bottom of the crank case as may be desired to maintain a level of oil in the crank case.

A supply tank 52 is employed. This tank may be of any approved material and is provided with a removable filler cap 53. The tank may be located either at the forward side or rear side of the dash of the vehicle, assuming that the invention is employed in conjunction with a motor vehicle, and preferably carries a sight gage 54. Extending between the bottom of the tank and the chamber 14 of the casing 10 is a detachably mounted pipe 55, and interposed in said pipe is a suitable stop cock 56.

Assuming now that the tank 52 is filled with oil, it will be seen that when the cock 56 is open, the oil will gravitate into the chamber 14 of the casing 10 and fill said chamber. Thus, as long as the casing 10 is disposed more or less in a vertical position, the valve 20 will be held open by the ball 19, as previously described, so that the oil will flow from the chamber 14 through the passage 23 of the valve stem and into the chamber 29, whence the oil will then flow through the pipe 41 to the valve chamber 34 and accordingly into the bowl 31 to raise the float 43 and shift the valve 47 to engage the seat 40 for controlling the ingress of oil and maintaining a substantially constant level of oil in the bowl and crank case 50. However, should the casing 10 be tilted too far from the vertical, say when the vehicle is ascending or descending a grade to cause the oil in the crank case 50 to run to either one end or the other of the crank case and thus create a false demand for additional oil therein, the ball 19 will be caused to roll away from the tip of the valve 20, when the valve will be closed, as previously described, to shut off the supply of oil through the device.

In this connection, the mounting of the feed valve 47 is to be noted. As will be observed, the nut 49 may be adjusted upwardly to permit free play of the valve in the socket 46. Thus, as the float 43 rises, the valve will gravitate until said valve strikes the seat 40. However, the mere weight of the valve will not be sufficient to close said valve, so that additional oil will flow past the valve until the float 43 is raised sufficiently to cause the nut 49 to engage the ball 48 and force the valve to its seat in firmly closed position. Thus, as will be seen, by adjusting the nut 49 to vary the free play of the valve, the level of the oil in the crank case may be varied, within limits, to gain an exact level found most expedient.

Having thus described my invention, what I claim is:

1. An oil level regulator for internal combustion engines including a casing having a bowl for attachment to an engine crank case, spaced means within the casing defining a supply chamber and a discharge chamber therein, the discharge chamber communicating with the bowl, a valve controlling the flow of oil from the supply chamber to the discharge chamber, an element confined within the casing and adapted to roll in all directions to coact with the valve and control the opening and closing thereof, and means responsive to the level of oil in the bowl for controlling the admission of oil thereto from said discharge chamber.

2. An oil level regulator for internal combustion engines including a casing having a bowl for attachment to an engine crank case, spaced means within the casing defining a supply chamber and a discharge chamber therein, the discharge chamber communicating with the bowl, a spring-closed valve controlling the flow of oil from the supply chamber to the discharge chamber, a ball mounted to normally roll toward the valve and hold it open but adapted to roll to a position permitting the valve to close, and means responsive to the level of oil in the bowl for controlling the admission of oil thereto from said discharge chamber.

3. An oil level regulator for internal combustion engines including a casing having a bowl for attachment to an engine crank case, spaced means within the casing defining a supply chamber and a discharge chamber therein and one provided with a cupped wall, the discharge chamber communicating with the bowl, a valve controlling the flow of oil from the supply chamber to the discharge chamber, an element mounted to coact with said wall and guided thereby for movement to normally engage the valve and hold it open but movable to a position to permit closing of the valve, means for closing the valve, and means responsive to the level of oil in the bowl for controlling the admission of oil thereto from said discharge chamber.

4. An oil level regulator for internal combustion engines including a casing having a bowl for attachment to an engine crank case, a valve assembly mounted within the casing and including spaced partitions defining a supply chamber therebetween, the casing being provided with a discharge chamber communicating with said bowl, a reciprocating spring-closed valve carried by said assembly and controlling the flow of oil from the supply chamber to the discharge chamber, a ball coacting with one of said partitions and normally engaging the valve to hold it open but adapted to roll to a position permitting the valve to close, and means responsive to the level of oil in the bowl for controlling the admission of oil thereto from said discharge chamber.

5. An oil level regulator for internal combustion engines including a casing having a bowl for attachment to an engine crank case, a valve assembly mounted within the casing and including spaced partitions defining a supply chamber therebetween, a cylinder depending from one of said partitions, the casing being provided with a discharge chamber communicating with said bowl, a valve reciprocable in said cylinder and controlling the flow of oil from said supply chamber to said discharge chamber, a spring in said cylinder urging the valve closed, a ball coacting with one of said partitions and normally engaging the valve to hold it open but adapted to roll to a position permitting the valve to close, and means responsive to the level of oil in the bowl for controlling the admission of oil thereto from said discharge chamber.

6. An oil level regulator for internal combustion engines including a casing having a bowl for attachment to an engine crank case, a valve assembly mounted within the casing and including spaced partitions defining a supply chamber therebetween, a cylinder and sleeve connecting said partitions, the sleeve being provided with a passage communicating with the supply chamber, a bottom partition within the casing defining a discharge chamber between said bottom partition and one of said first mentioned partitions, the discharge chamber communicating with said bowl, a valve having a head reciprocable in said cylinder and a stem reciprocable in said sleeve, the stem having a hollow portion forming an outlet passage communicating with said discharge chamber and being provided in its hollow portion with a port adapted to register with the passage in the sleeve, a spring within the cylinder urging the valve upwardly to closed position, a ball to coact with the head for depressing the valve and normally holding it open to maintain said port in communication with the passage in the sleeve, and means responsive to the level of oil in the bowl for controlling the admission of oil thereto from said discharge chamber.

7. An oil level regulator for internal combustion engines including a casing, means within the casing defining a supply chamber therein, a bottom partition within the casing coacting with said means to define a discharge chamber at the lower portion of the casing, a float bowl for attachment to an engine crank case and mating with the lower end of the casing, means extending through the bowl to engage said partition and detachably connecting the bowl with the casing, means connecting said discharge chamber with the bowl, a valve controlling the flow of oil from the supply chamber to the discharge chamber, a ball to coact with the valve to control the opening and closing thereof, and means responsive to the level of oil in the bowl for controlling the admission of oil thereto from said discharge chamber.

8. An oil level regulator for internal combustion engines including a casing having a bowl for attachment to an engine crank case, spaced means within the casing defining a supply chamber and a discharge chamber therein, the discharge chamber communicating with the bowl, a valve controlling the flow of oil from the supply chamber to the discharge chamber, an element confined within the casing and adapted to roll in all directions to coact with the valve and control the opening and closing thereof, and means responsive to the level of oil in the bowl for controlling the admission of oil thereto from said discharge chamber and adjustable for varying said level.

9. An oil level regulator for internal combustion engines including a casing having a float bowl for attachment to an engine crank case, a valve chamber carried by the bowl to communicate therewith, spaced means within the casing defining a supply chamber and a discharge chamber therein, the discharge chamber communicating with said valve chamber, a valve controlling the flow of oil from said supply chamber to said discharge chamber, a rolling element controlling the opening and closing of the valve, a pivoted float lever, a float carried thereby within the bowl, a feed valve mounted upon the lever and operable thereby with the rise and fall of the float to control the admission of oil to said valve chamber and maintain a substantially constant level of oil in the bowl, and means adjustable to permit movement of the lever independently of the feed valve whereby to vary the normal level of oil in the bowl.

10. An oil level regulator for internal combustion engines including a casing having a float bowl for attachment to an engine crank case, a valve chamber carried by the bowl to communicate therewith, spaced means within the casing defining a supply chamber and a discharge chamber therein, the discharge chamber communicating with said valve chamber, a valve controlling the flow of oil from said supply chamber to said discharge chamber, a rolling element controlling the opening and closing of the valve, a pivoted float lever extending between said valve chamber and said bowl and provided at one end with a socket within said valve chamber, a float carried by the opposite end of said lever within the bowl, a feed valve extending through said socket and provided with a ball freely received therein, the feed valve being operable by the lever with the rise and fall of the float to control the admission of oil to said valve chamber and maintain a substantially constant level of oil in the bowl, and a nut mounted in said socket to coact with said ball and adjustable to permit free play of the ball in the socket and consequent movement of the lever independently of the feed valve whereby to vary the normal level of oil in the bowl.

STEWART B. WHITLOCK.